(12) United States Patent
Hasegawa et al.

(10) Patent No.: US 12,399,125 B2
(45) Date of Patent: Aug. 26, 2025

(54) OPTICAL RECEIVER FOR METEOROLOGICAL LIDAR

(71) Applicant: EKO INSTRUMENTS CO., LTD., Tokyo (JP)

(72) Inventors: Toshikazu Hasegawa, Tokyo (JP); Eiji Takeuchi, Tokyo (JP); Makoto Tsukamoto, Tokyo (JP); Masanori Yabuki, Kyoto (JP)

(73) Assignee: EKO INSTRUMENTS CO., LTD., Tokyo (JP)

( * ) Notice: Subject to any disclaimer, the term of this patent is extended or adjusted under 35 U.S.C. 154(b) by 1098 days.

(21) Appl. No.: 17/417,249

(22) PCT Filed: Dec. 25, 2019

(86) PCT No.: PCT/JP2019/050744
§ 371 (c)(1),
(2) Date: Jun. 22, 2021

(87) PCT Pub. No.: WO2020/138133
PCT Pub. Date: Jul. 2, 2020

(65) Prior Publication Data
US 2022/0011233 A1    Jan. 13, 2022

(30) Foreign Application Priority Data
Dec. 25, 2018   (JP) ................. 2018-241837

(51) Int. Cl.
*G01J 3/44* (2006.01)
*G01N 21/65* (2006.01)
(Continued)

(52) U.S. Cl.
CPC ............ *G01N 21/65* (2013.01); *G01S 7/4816* (2013.01); *G01S 17/95* (2013.01); *G01N 2201/068* (2013.01)

(58) Field of Classification Search
CPC ............ G01N 21/65; G01N 2201/068; G01N 2021/1795; G01J 3/44; G01S 7/4816;
(Continued)

(56) References Cited

U.S. PATENT DOCUMENTS

| | | | | |
|---|---|---|---|---|
| 4,394,573 A | * | 7/1983 | Correa | G01V 8/02 250/573 |
| 9,905,992 B1 | * | 2/2018 | Welford | G01S 7/4814 |

(Continued)

FOREIGN PATENT DOCUMENTS

| | | |
|---|---|---|
| JP | H07-043528 A | 2/1995 |
| JP | H10-300915 A | 11/1998 |

(Continued)

OTHER PUBLICATIONS

M. Froidevaux et al., "A new lidar for water vapor and temperature measurements in the Atmospheric Boundary Layer", AsiaFlux Newsletter, Issue No. 28, Mar. 2009, pp. 13-17.
(Continued)

*Primary Examiner* — Abdullahi Nur
(74) *Attorney, Agent, or Firm* — GREENBLUM & BERNSTEIN, P.L.C.

(57) ABSTRACT

An optical receiver for a meteorological lidar capable of accurate measurement of scattered light generated by emitting a laser beam of the UVC range (wavelength of 200 to 280 nm) into the air, without using a diffraction grating, is provided. The optical receiver for a meteorological lidar that emits a laser beam of a specific wavelength in the UVC range into the air and measures scattered light generated by the laser beam includes a reflector that reflects incident light to a predetermined direction, and a spectrometer that isolates a specific wavelength from incident light from the reflector, wherein the spectrometer includes interference filters.

5 Claims, 4 Drawing Sheets

(51) Int. Cl.
*G01S 7/481* (2006.01)
*G01S 17/95* (2006.01)

(58) Field of Classification Search
CPC ......... G01S 17/88; G01S 17/95; Y02A 90/10; G01W 1/02
See application file for complete search history.

(56) References Cited

U.S. PATENT DOCUMENTS

| | | | |
|---|---|---|---|
| 10,598,596 B1* | 3/2020 | Hug | G01N 21/64 |
| 2007/0153281 A1* | 7/2007 | Gordon | G01N 21/86 |
| | | | 356/419 |
| 2007/0195310 A1* | 8/2007 | Kanda | G01N 15/1433 |
| | | | 356/73 |
| 2012/0209536 A1* | 8/2012 | Hughes | G01N 21/3559 |
| | | | 356/51 |
| 2013/0293882 A1* | 11/2013 | Dottery | G01J 3/44 |
| | | | 356/301 |
| 2018/0196179 A1 | 7/2018 | Takishita et al. | |
| 2018/0269646 A1* | 9/2018 | Welford | H01S 3/0627 |

FOREIGN PATENT DOCUMENTS

| | | |
|---|---|---|
| JP | 2015-105885 A | 6/2015 |
| WO | 2017/056909 A1 | 4/2017 |

OTHER PUBLICATIONS

Masanori Yabuki et al., "Daytime Water Vapor Profiling of UV-C Raman Lidar", 33rd Laser Radar Symposium Abstracts, Internet: <URL:https://laser-sensing.jp/33thLSS/33th_papers/F3_yabuki.pdf>, Sep. 11, 2015, pp. 144-145.

International Search Report (including English Language Translation), mailed Feb. 18, 2020 by the Japan Patent Office (JPO), in International Application No. PCT/JP2019/050744.

Dongchen Shi et al., "Simulation and Design of Solar-blind Raman Lidar for Water Vapor Measurement", Proceedings of SPIE; [Proceedings of SPIE, ISSN 027-786X, vol. 10524], SPIE, US, vol. 10256, Feb. 28, 2017, pp. 102565Z-1 to 1026565Z-7, XP060087438, DOI: 10.1117/12.2256278.

Wang Yufeng et al.: "A UV multifunctional Raman lidar system for the observation and analysis of atmospheric temperature, humidity, aerosols and their conveying characteristics over Xi'an", Journal of Quantitative Spectroscopy and Radiative Transfer, vol. 205, Oct. 13, 2017, pp. 114-126, XP085287897, ISSN: 0022-4073.

Jens Reichardt et al., "RAMSES: German Meteorological Service autonomous Raman lidar for water vapor, temperature, aerosol, and cloud measurements", Applied Optics, vol. 51, No. 34, Dec. 1, 2012, pp. 8111-8131, XP055943593.

* cited by examiner

OPTICAL RECEIVER FOR METEOROLOGICAL LIDAR

TECHNICAL FIELD

The present invention relates to an optical receiver for a meteorological lidar.

BACKGROUND ART

In view of series of extreme weathers such as local torrential rainfall in recent years, it is desirable to improve the accuracy of weather forecast to allow abnormal weather conditions to be predicted earlier and take precautions. For more accurate weather prediction, it is known to be effective to observe various meteorological elements on the ground surface and to observe the atmosphere using radars, and in addition, to observe vertical distributions of temperature, water vapor concentration, wind direction/wind speed in the atmospheric boundary layer and to enter such data into weather forecasting models to implement calculations.

Meteorological lidars are known as a means of measurement of the vertical distributions of temperature, water vapor concentration, wind direction/wind speed in the atmosphere. Lidars for the measurement of wind direction/wind speed have become commercially available as so-called Doppler lidars and used for research into wind conditions in the construction of wind farms. There are two types of lidars that measure water vapor concentration distribution: one is a differential absorption lidar (DIAL) and the other is a Raman lidar.

The DIAL transmits laser light of two closely spaced wavelengths to the atmosphere. The one wavelength exhibits a small absorption by water vapor ($\lambda$-off wavelength) and the other wavelength exhibits a large absorption by water vapor ($\lambda$-on wavelength). The light elastically scattered by aerosol or the like in the atmosphere is observed on the ground, and the light attenuation rates of the two wavelengths at respective altitudes are compared to determine the water vapor concentration. This method requires extremely precise control of the two wavelengths, i.e., requiring a wavelength stability of 1 µm or less.

The Raman lidar emits laser light to the atmosphere and detects light, Raman-scattered by water vapor ($H_2O$) molecules, nitrogen ($N_2$) molecules, and oxygen ($O_2$) molecules in the atmosphere, on the ground, to measure the $H_2O$ concentration from an intensity ratio between two scattered light beams and to measure the distribution of water vapor concentration. Since Raman-scattered light is very low in intensity, it is important to detect the same with high accuracy.

Regarding Raman lidars in research and development, it is common to use a harmonic of YAG laser, such as a wavelength of 355 nm. When using the wavelength of 355 nm, the wavelengths of light Raman-scattered by water vapor ($H_2O$) and nitrogen ($N_2$) molecules are 387 nm and 405 nm, respectively. It is extremely difficult to detect the Raman-scattered light of these wavelengths with high accuracy during the day because of the mixed sunlight that is the source of noise. Accordingly, the measurement of water vapor concentration using this wavelength is normally implemented only during the night. The laser wavelength of 355 nm is also commonly used for temperature measurement Raman lidars, but likewise, accurate measurement during the day is not possible because of the sunlight that is the source of noise.

A Raman lidar that uses the wavelength of 266 nm, which is fourfold the harmonic of YAG laser in the UVC range (ultraviolet C, wavelengths of 200 to 280 nm), is known as a method of eliminating the influence of sunlight during the day to allow accurate measurement both day and night (see Non-Patent Document 1 below). When using laser of this wavelength, the wavelengths of light Raman-scattered by oxygen ($O_2$), nitrogen ($N_2$), and water vapor ($H_2O$) molecules in the atmosphere are 278 nm, 284 nm, and 295 nm, respectively. Sunlight in the wavelength range of 300 nm or less is absorbed by the ozone layer in the atmosphere (altitude of 10 to 50 km) and hardly reaches the ground surface, i.e., hardly becomes the source of noise.

Polychromator-based detectors are used as photodetectors of such meteorological lidars (for example, see Patent Document 1). In such a polychromator-based detector, some of light entering therein passes through a reflector, and the light that has passed through the reflector is reflected by a reflection mirror and reaches a spectrometer. The spectrometer is configured by a diffraction grating (grating) which splits the incident light into individual wavelengths (divides wavelengths) and guides the light onto a light receiving part via a reflection mirror. Namely, the mechanism thereof causes individual wavelengths of the light that entered the spectrometer to reach different positions on the light receiving part.

CITATION LIST

Patent Document

Patent Document 1: Patent Publication JP-A-2015-105885

Non-Patent Document 1: M. Froidevaux and six others, "A new lidar for water vapor and temperature measurements in the Atmospheric Boundary Layer", AsiaFlux Newsletter Issue 28, 13-17, March 2009

SUMMARY

Technical Problem

As mentioned above, when a diffraction grating such as, typically, a polychromator is used for the spectrometer of a Raman lidar that uses a laser beam in the UVC range, stray light causes unwanted spectra to be mixed with the target wavelength as noise. Raman-scattered light is very weak and is extremely susceptible to the influence of noise.

Accordingly an object of the present invention is to provide an optical receiver for a meteorological lidar capable of accurate measurement of scattered light generated by emitting a laser beam of the UVC range into the air, without using a diffraction grating.

Solution to Problem

An optical receiver for a meteorological lidar according to one aspect of the present invention is an optical receiver for a meteorological lidar emitting a laser beam of a specific wavelength in a UVC range into the air, and measuring scattered light generated by the laser beam, and includes a spectrometer that isolates a specific wavelength from incident light, the spectrometer including interference filters. The interference filters include an interference filter for light Raman-scattered by nitrogen molecules and an interference filter for light Raman-scattered by water vapor molecules, the interference filters having different central wavelengths from each other. The interference filter for light Raman-scattered by nitrogen molecules has a full width at half maximum of 5 nm or less, and the interference filter for light Raman-scattered by water vapor molecules has a full width at half maximum of 1.2 nm or less.

According to this aspect, by using interference filters in the spectrometer of the optical receiver for a meteorological lidar, wavelengths to be transmitted can be readily separated from wavelengths to be blocked. Hardly affected by the sunlight, measurement using the UVC range, in particular, does not require narrow transmission band interference filters since, and with the use of broad transmission band interference filters that can be easily producible and have a high transmittance, the influence of stray light can be avoided and the meteorological lidar performance can be improved.

Increasing the maximum transmittance of an interference filter is contradictory to the reducing of its full width at half maximum (FWHM). The full width at half maximum (FWHM) needs to be wider for a higher maximum transmittance, and reducing the full width at half maximum (FWHM) lowers the transmittance. The characteristics of the interference filters described above allow the maximum transmittance to be raised to intensify the reception of scattered light, whereby noise can be reduced.

In another aspect of the present invention, the interference filter may be configured of a plurality of interference filters. According to this aspect in a case where a plurality of interference filters are combined, while the transmittance is reduced, the full width at half maximum (FWHM) can be made narrower. Therefore, with a predetermined transmittance requirement being satisfied, characteristics that are not found in one interference filter alone can be achieved.

In another aspect of the present invention, at least one of the plurality of interference filters may have a central wavelength identical to those of others but has a different half width. According to the above aspect, for example, with a combination of an interference filter with a high transmittance and a broad full width at half maximum (FWHM), and an interference filter with a low transmittance and a narrow full width at half maximum (FWHM), the transmittance will be a multiple of the rates of the combined interference filters, while the full width at half maximum (FWHM) will be narrow. In this case, too, characteristics that are not found in one interference filter alone can be achieved.

In another aspect of the present invention, the optical receiver may further include a dichroic mirror that reflects light of a specific wavelength from incident light while transmitting light of other wavelengths, and the spectrometer may isolate a wavelength from light reflected by the dichroic mirror. According to this aspect, by using an interference filter and a dichroic mirror in combination, the noise caused by sunlight is reduced by the dichroic mirror before the light enters the interference filter, and Raman-scattered light can be detected more accurately than by the interference filter.

Advantageous Effects of Invention

The present invention can provide an optical receiver for a meteorological lidar capable of accurate measurement of scattered light generated by emitting a laser beam of the UVC range (ultraviolet C, wavelength of 200 to 280 nm) into the air, without using a diffraction grating.

DESCRIPTION OF EMBODIMENTS

Figure 1:
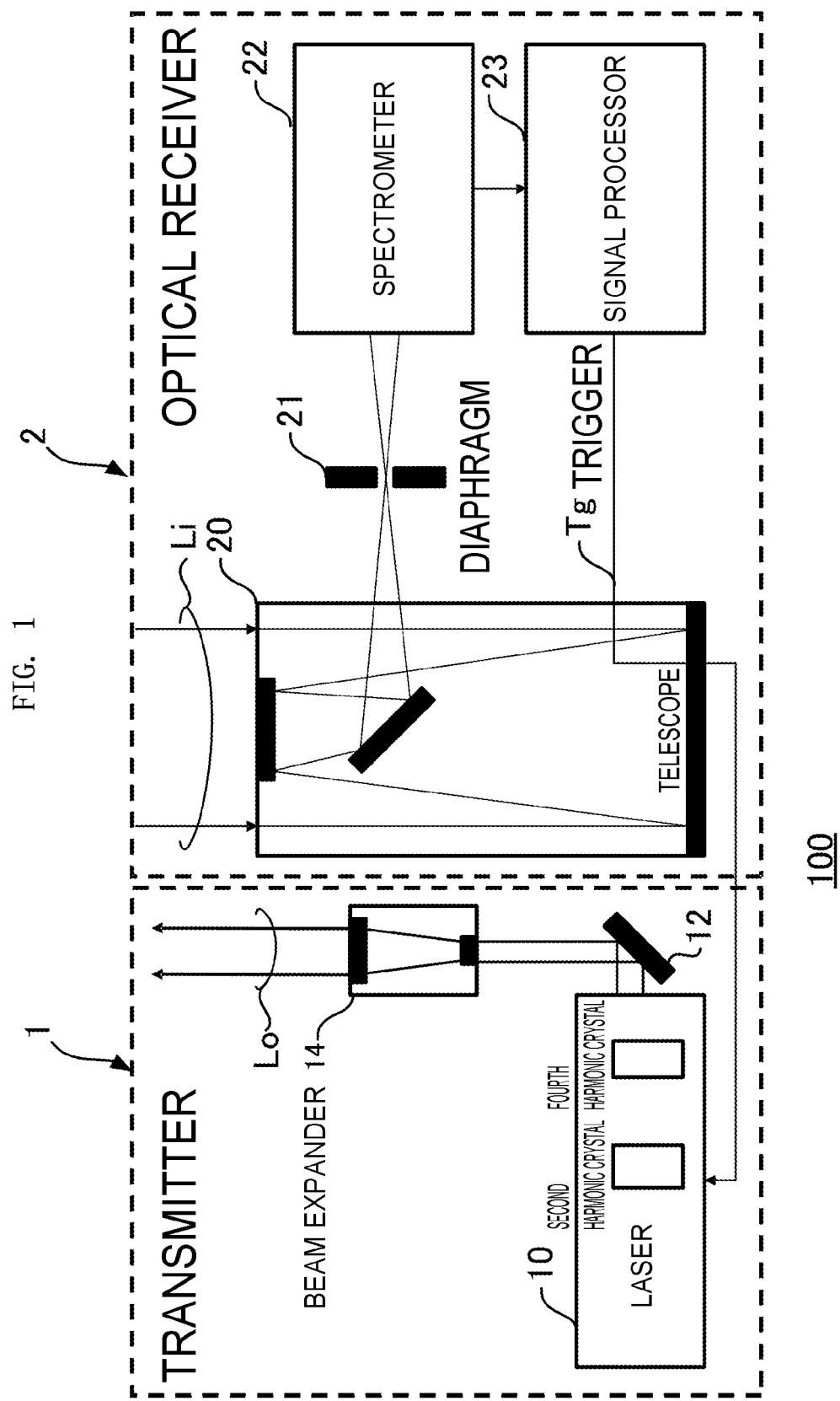
FIG. 1 is a diagram illustrating an overall configuration of a meteorological lidar that uses a spectrometer in one embodiment of the present invention.

A preferred embodiment of the present invention (hereinafter "present embodiment") will be hereinafter described with reference to the accompanying drawings (elements given the same reference numerals in each drawing have the same or similar configuration).

(Basic Configuration: Meteorological Lidar)

FIG. 1 illustrates a basic configuration of a meteorological lidar that uses the optical receiver for a meteorological lidar in the present embodiment. As illustrated in FIG. 1, the meteorological lidar 100 of the present embodiment is roughly made up of a transmitter 1 and a receiver 2. The present embodiment relates particularly to specifics of the receiver 2.

As illustrated in FIG. 1, the transmitter 1 mainly includes a laser 10, a mirror 12, and a beam expander 14. The transmitter 1 is equipped with the function of light emitting means for emitting laser light of a wavelength in the UV range to the atmosphere.

The laser 10 is the light emitting means that emits a laser beam at a predetermined UV wavelength of, e.g., 266 nm by a combination of optical devices such as a second harmonic crystal and a fourth harmonic crystal. The wavelength of the laser beam is selected from a range that generates vibrational Raman-scattered light by the Raman effect when emitted to the atmospheric components to be measured, such as water vapor ($H_2O$), nitrogen ($N_2$), and oxygen ($O_2$) molecules. The mirror 12 is an optical device that reflects and directs the output laser beam upward. The beam expander 14 is an optical device that enlarges the diameter of the laser beam entering as coherent parallel light and outputs it as exiting light Lo.

The transmitter 1 may be provided with a precision air conditioner that keeps the dust content in a space enclosing part or all of the optical path of the laser beam to a certain level or less. With a precision air conditioner, damage to optical components is inhibited and durability can be improved. The transmitter 1 may optionally be provided with a temperature adjusting mechanism that keeps temperature changes of optical components and surrounding space to a certain level or less. Preventing sudden temperature fluctuations of the optical system can also inhibit damage to optical components, and can improve durability. The shorter the wavelength, the smaller the laser-induced damage threshold (laser beam density at which damage starts) of optical devices, and generally the more severely the optical devices suffer damage. The configuration described above can realize stable operation of the meteorological lidar using the laser of a wavelength in the UVC range, which is particularly hard to achieve.

The receiver 2 includes a telescope 20, a aperture 21, a spectrometer 22, and a signal processor 23. When atmospheric components such as water vapor ($H_2O$), nitrogen ($N_2$), and oxygen ($O_2$) molecules are irradiated with the exiting light Lo emitted to the atmosphere from the transmitter 1 described above, vibrational Raman-scattered light is generated by the Raman effect, part of which enters the meteorological lidar 100 as incident light Li. The receiver 2 is equipped with the function of scattered light detection means that detects the vibrational Raman-scattered light contained in this incident light Li.

The telescope 20 converges the light beam of entering incident light Li. The aperture 21 let the converged incident light Li pass through and filters out unnecessary light components. The telescope in the present embodiment has a diameter of 20 cm, but is not limited to this. For example, a telescope with a larger diameter may be used, in which case the signal intensity of light will be higher, which allows the transmittance to be described later to be lower.

The spectrometer 22, which relates to the present invention, isolates and detects vibrational Raman-scattered light from the incident light Li, and outputs a detection signal. The spectrometer 22 adopts a configuration that isolates and extracts Raman-scattered light by the use of interference filters, i.e., it is configured without diffraction gratings such as, typically, polychromators. Specific configurations will be described in detail with reference to FIG. 2 onwards.

The signal processor 23 analyzes the input of the detection signal acquired by the detection of vibrational Raman-scattered light, and determines the water vapor concentration of the atmosphere based on the intensities of vibrational Raman-scattered light of a plurality of wavelengths.

Embodiment

Figure 2:
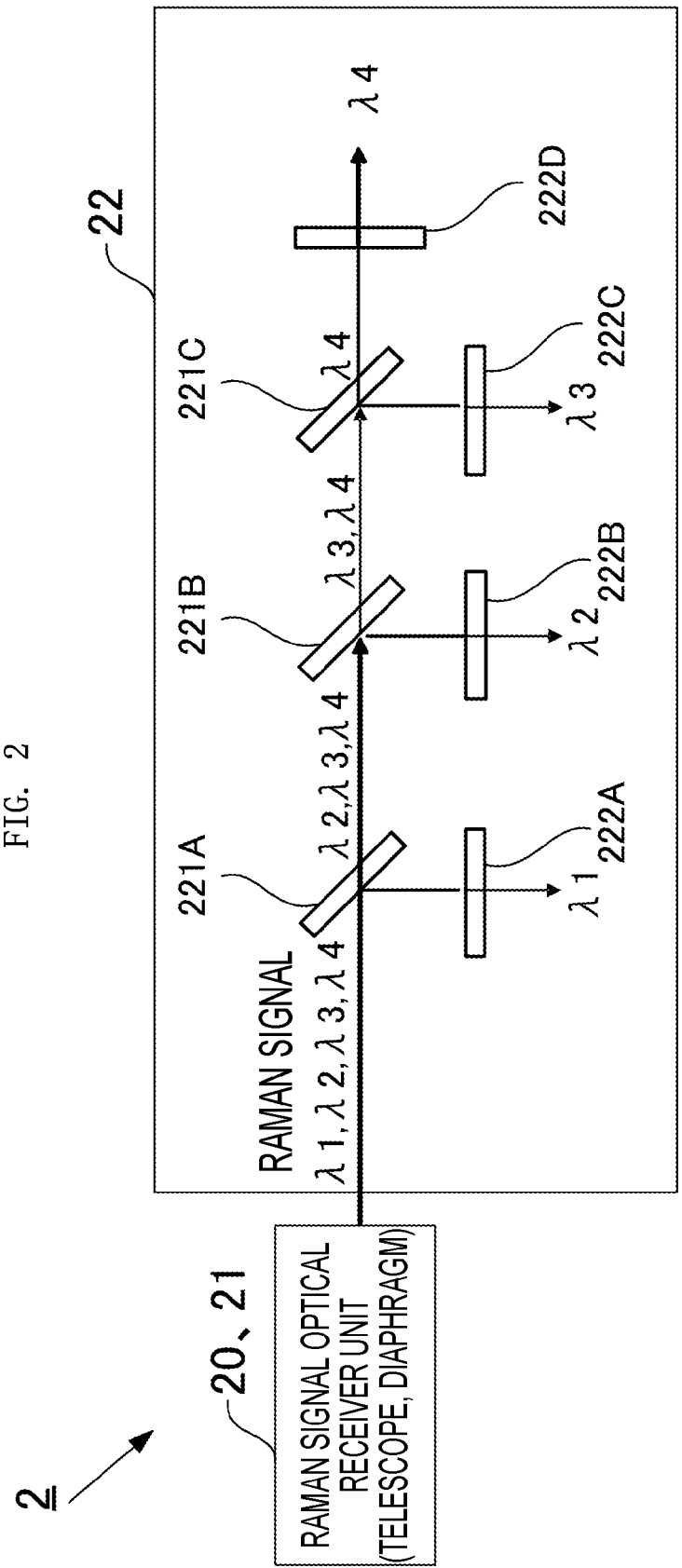
FIG. 2 is a diagram illustrating a configuration of an optical receiver for the meteorological lidar in the embodiment of the present invention.

Next, the configuration of an optical receiver 2 for a meteorological lidar according to Embodiment 1 of the present invention will be described with reference to FIG. 2. FIG. 2 is a schematic diagram illustrating a configuration of the optical receiver 2 for the meteorological lidar.

FIG. 2 is a configuration example of the optical receiver 2 for the meteorological lidar in the present embodiment. In this example, Raman-scattered light is isolated and extracted using dichroic mirrors 221 (221A to 221C) and interference filters 222 (222A to 222D). In this example, the order of 222A to 222C of the interference filters 222 can be changed around, as long as they are configured such as to be able to isolate a wavelength.

Namely, a Raman signal A (lambda) enters from the telescope 20 and aperture 21, which are the Raman signal optical receiver unit, and specific wavelengths (λ1 to λ4) are reflected by the dichroic mirrors 221 (221A to 221C), and detected by the interference filters 222 (222A to 222D).

The dichroic mirror 221A and interference filter 222A extract light (λ1) Raman-scattered by water vapor (H$_2$O) molecules and having a central wavelength of 295 nm. The dichroic mirror 221B and interference filter 222B extract light (λ2) Raman-scattered by nitrogen (N$_2$) molecules and having a central wavelength of 284 nm. The dichroic mirror 221C and interference filter 222C extract light (λ3) Raman-scattered by oxygen (O$_2$) molecules and having a central wavelength of 278 nm.

More specifically, the dichroic mirror 221A reflects light at 295 nm and above and let light below 295 nm pass through, so that light of wavelengths of 295 nm and above enters the interference filter 222A. The dichroic mirror 221B reflects light at 284 nm and above and let light below 284 nm pass through, so that light of wavelengths of 284 nm and above enters the interference filter 222B. The dichroic mirror 221C reflects light at 278 m and above and let light below 278 nm pass through, so that light of wavelengths of 278 nm and above enters the interference filter 222C.

By using the interference filters 222 and dichroic mirrors 221 in combination this way, the noise caused by sunlight is reduced by the dichroic mirrors 221 before the light enters the interference filters 221, allowing more accurate detection of Raman-scattered light by the interference filters 222.

The illustrated optimal example shows a configuration having three interference filters 222 (222A to 222C) respectively for three rays of light, i.e., light (λ1) Raman-scattered by water vapor (H$_2$O) molecules, light (λ2) Raman-scattered by nitrogen (N$_2$) molecules, and light (λ3) Raman-scattered by oxygen (O$_2$) molecules. Basically, however, water vapor concentration can be determined with the paired combination of dichroic mirrors 221A and 221B and interference filters 222A and 222B, from the intensity ratio between the light Raman-scattered by water vapor (H$_2$O) molecules and the light Raman-scattered by nitrogen (N$_2$) molecules. In the case of using a laser beam in the UV range, the light Raman-scattered by nitrogen (N$_2$) molecules is partly absorbed by ozone before it reaches the ground surface. The dichroic mirror 221C and interference filter 222C are provided to measure the intensity of the light Raman-scattered by oxygen (O$_2$) molecules for the purpose of making corrections in consideration of this influence. Wavelength separation is possible with the paired combination of dichroic mirrors 221A and 221B and interference filters 222A and 222B, when measurement is to be made in a location with a little amount of ozone.

An interference filter 222D is provided as the channel for receiving light elastically scattered by aerosol or the like (Mie scattered light). This scattered light has the same wavelength as that of the laser beam, i.e., with a beam of 266 nm, for example, the central wavelength of the interference filter is 266 nm. Measurement of the Mie scattered light is not directly related to the measurement of the water vapor concentration but for the confirmation of the laser beam being emitted to the atmosphere without any problem. In addition to the water vapor concentration, the extinction coefficient of the laser beam, which is determined by the aerosol and therefore an index of the aerosol concentration in the atmosphere, may also be measured.

Figure 3:
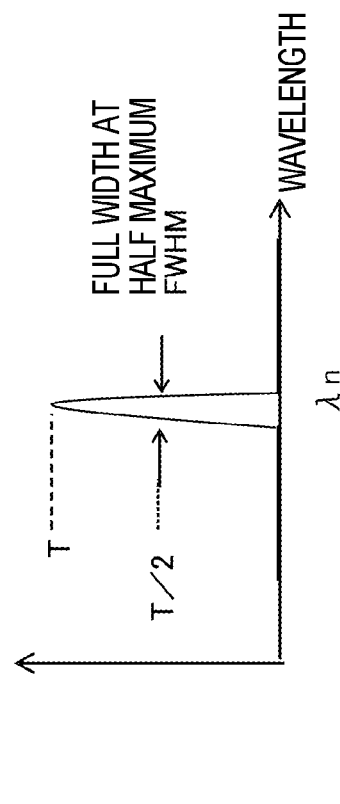
FIG. 3 is a schematic graph chart illustrating the transmission characteristics of interference filters shown in FIG. 2.

FIG. 3 shows the transmission characteristics of the interference filter 222. As shown in FIG. 3, T(λ) represents the transmittance of the interference filter 222, and the width of the wavelength at half (T/2) of the transmittance T is called the half width, or the full width at half maximum (FWHM). The transmittance T(λ) of each interference filter 222 at wavelength λ is expressed by Formula 1.

$$T(\lambda) = T_{max} * \exp\left(-\ln 2 * \frac{(\lambda - \lambda_0)^2}{\Delta\lambda^2}\right) \quad [\text{Math. 1}]$$

In Formula 1, $T_{max}$ represents the maximum transmittance of the interference filter 222, $\lambda_0$ represents the central transmission wavelength, $\Delta\lambda$ represents the half width at half maximum (HWHM) of the interference filter 222, which is one half of the full width at half maximum (FWHM).

Selection of optimal maximum transmittance and optimal half width when configuring the optical receiver 2 for a meteorological lidar is important to increase the accuracy of measured water vapor concentration. Accordingly, it is desirable that the maximum transmittance of each interference filter 222 be as high as possible to intensify the reception of scattered light so that noise (shot noise) is reduced, and that the half width be narrow. This is for preventing noise originating from the sunlight mixed in each Raman-scattered light beam.

In other words, raising the transmittance of the interference filter 222 intensifies the signal, and with the signal intensity S being increased by n times, the SN ratio (ratio between signal and noise) is improved by √n. Generally, the higher the transmittance, the wider the full width at half maximum (FWHM), resulting in increased noise by sunlight. With an m-times wider full width at half maximum (FWHM), the noise increases approximately by m times.

From the production perspective, increasing the maximum transmittance of the interference filter and reducing its full width at half maximum (FWHM) are contradictory, i.e., in order to increase the maximum transmittance, the full width at half maximum (FWHM) needs to be wide. Reducing the full width at half maximum (FWHM) means reducing the maximum transmittance.

In view of the above, the interference filters 222 satisfy the following characteristics requirements in the present embodiment: the interference filter 222B for the light where $T_{max}$ represents the transmittance and $\Delta\lambda$ represents the half width of one interference filter.

The transmission characteristics when two interference filters of different characteristics are combined are as follows:

$$T_{3max} = T_{1max} * T_{2max}, \Delta\lambda_3 = \Delta\lambda_1 * \Delta\lambda_2 / (\Delta\lambda_1^2 + \Delta\lambda_2^2)^{0.5}$$

$T_{1max}$ and $T_{2max}$ represent the respective maximum transmittances of two interference filters, and $T_3$ represents the maximum transmittance when the two interference filters are combined. $\Delta\lambda_1$ and $\Delta\lambda_2$ represent the half widths of the two interference filters, and $\Delta\lambda_3$ represents the half width when the two interference filters are combined.

Table 1 shows one configuration example of interference filters for a lidar used for measuring water vapor concentration with a laser beam of 266 nm. Two interference filters with different characteristics are used for the detection of light Raman-scattered by water vapor ($H_2O$) molecules, and two interference filters with the same characteristics are used for others.

TABLE 1

| | | 222A (Extraction relative to $H_2O$) | | 222B (Extraction relative to $N_2$) | 222C (Extraction relative to $O_2$) |
|---|---|---|---|---|---|
| Characteristics of Interference Filters | Central Wavelength (nm) | 294.6 | 294.6 | 283.6 | 277.6 |
| | FWHM (nm) | 3 | 1 | 5 | 5 |
| | Transmittance (%) | 40 | 25 | 45 | 48 |
| | Number of Filters | 1 | 1 | 2 | 2 |
| Characteristics of Filter Combinations | Central Wavelength (nm) | 294.6 | | 283.6 | 277.6 |
| | FWHM (nm) | 0.9 | | 3.5 | 3.5 |
| | Transmittance (%) | 10 | | 20 | 23 |

*FWHM (Full Width at Half Maximum) = 2*$\Delta\lambda$ ($\Delta\lambda$: Half Width)

Raman-scattered by nitrogen ($N_2$) molecules, and the interference filter 222C for the light Raman-scattered by oxygen ($O_2$) molecules are each configured by one or a combination of two or more interference filters, and have a maximum transmittance of 15% or more and a full width at half maximum (FWHM) of 5 nm or less; and the interference filter 222A for the light Raman-scattered by water vapor ($H_2O$) molecules is configured by one or a combination of two or more interference filters, and has a maximum transmittance of 8% or more and a full width at half maximum (FWHM) of 0.9 nm or less.

According to the present embodiment, in addition to the case where one each interference filter 222 is used for each wavelength of Raman-scattered light, a plurality of interference filters may be used for each wavelength.

Specifically, in an optimal configuration of interference filters 222 according to the present embodiment, each of the interference filters 222A to 222C is configured with a combination of two filters. For the interference filters 222B and 222C, two interference filters having the same characteristics are used, and for the interference filter 222A, two interference filters having different half widths and transmittances are used.

The transmission characteristics, i.e., maximum transmittance $T_{2max}$ and half width $\Delta\lambda_2$, when two interference filters of the same characteristics are combined, are as follows:

$$T_{2max} = T_{max}^2, \Delta\lambda_2 = \Delta\lambda/\sqrt{2}$$

In the present embodiment, two interference filters of the same characteristics are used for the interference filter 222B for the light Raman-scattered by nitrogen ($N_2$) molecules, and the interference filter 222C for the light Raman-scattered by oxygen ($O_2$) molecules to achieve a relatively large full width at half maximum (FWHM), while the interference filter for the light Raman-scattered by water vapor ($H_2O$) molecules is designed to have a narrow full width at half maximum (FWHM).

The reason is as follows: the light Raman-scattered by oxygen ($O_2$) molecules is in the solar blind range (of wavelength 280 nm or less) so that the sunlight contained therein does not reach the ground surface, and the full width at half maximum (FWHM) can be made wide. The light Raman-scattered by nitrogen ($N_2$) molecules is substantially in the solar blind range so that likewise the full width at half maximum (FWHM) can be made wide. On the other hand, sunlight is mixed in the Raman-scattered light wavelength of water vapor ($H_2O$) molecules (295 nm) to a significant level, so that the full width at half maximum (FWHM) needs to be made narrow.

According to another embodiment described above, by using the interference filters 222 in the spectrometer 22 of the optical receiver 2 for a meteorological lidar, wavelengths to be transmitted can be readily separated from wavelengths to be blocked. Measurement using the UVC range, in particular, does not require narrow transmission band interference filters 222 since it is hardly affected by the sunlight, and with the use of broad transmission band interference filters 222 that are easily producible and have a high transmittance, the influence of stray light can be avoided and consequently the meteorological lidar performance can be improved.

The interference filter for the light Raman-scattered by nitrogen ($N_2$) molecules and the interference filter for the light Raman-scattered by oxygen ($O_2$) molecules may have a maximum transmittance of 15% or more, preferably 20% or more, and a full width at half maximum of 5 nm or less, preferably 3.5 nm or less. The interference filter for the light Raman-scattered by water vapor ($H_2O$) molecules may have a maximum transmittance of 5% or more, preferably 10% or more, and a full width at half maximum of 1.2 nm or less, preferably 0.9 nm or less. This way, the maximum transmittance can be increased to intensify the reception of scattered light, whereby noise can be reduced.

The transmittances specified above are preferable in the present embodiment where the telescope has a diameter of 20 cm as mentioned above. With a telescope having a larger diameter, the signal intensity of light will be higher and there will be no problem if the transmittance is made lower.

Moreover, while the transmittance will be reduced, configuring the interference filter 222 with a plurality of interference filters allows the full width at half maximum (FWHM) to be made narrower. Therefore, with a predetermined transmittance requirement being satisfied, characteristics that are not found in one interference filter 222 alone can be achieved.

The plurality of interference filters 222 may have different characteristics, i.e., at least one of them may have a central wavelength identical to that of others and a different half width. With a combination of an interference filter with a high transmittance and a broad full width at half maximum (FWHM) and an interference filter with a low transmittance and a narrow full width at half maximum (FWHM), the transmittance will be a multiple of the rates of the combined interference filters, while the full width at half maximum (FWHM) will be narrow. In this case, too, the combination can provide characteristics that are not found in one interference filter alone.

Other Embodiments

Figure 4:
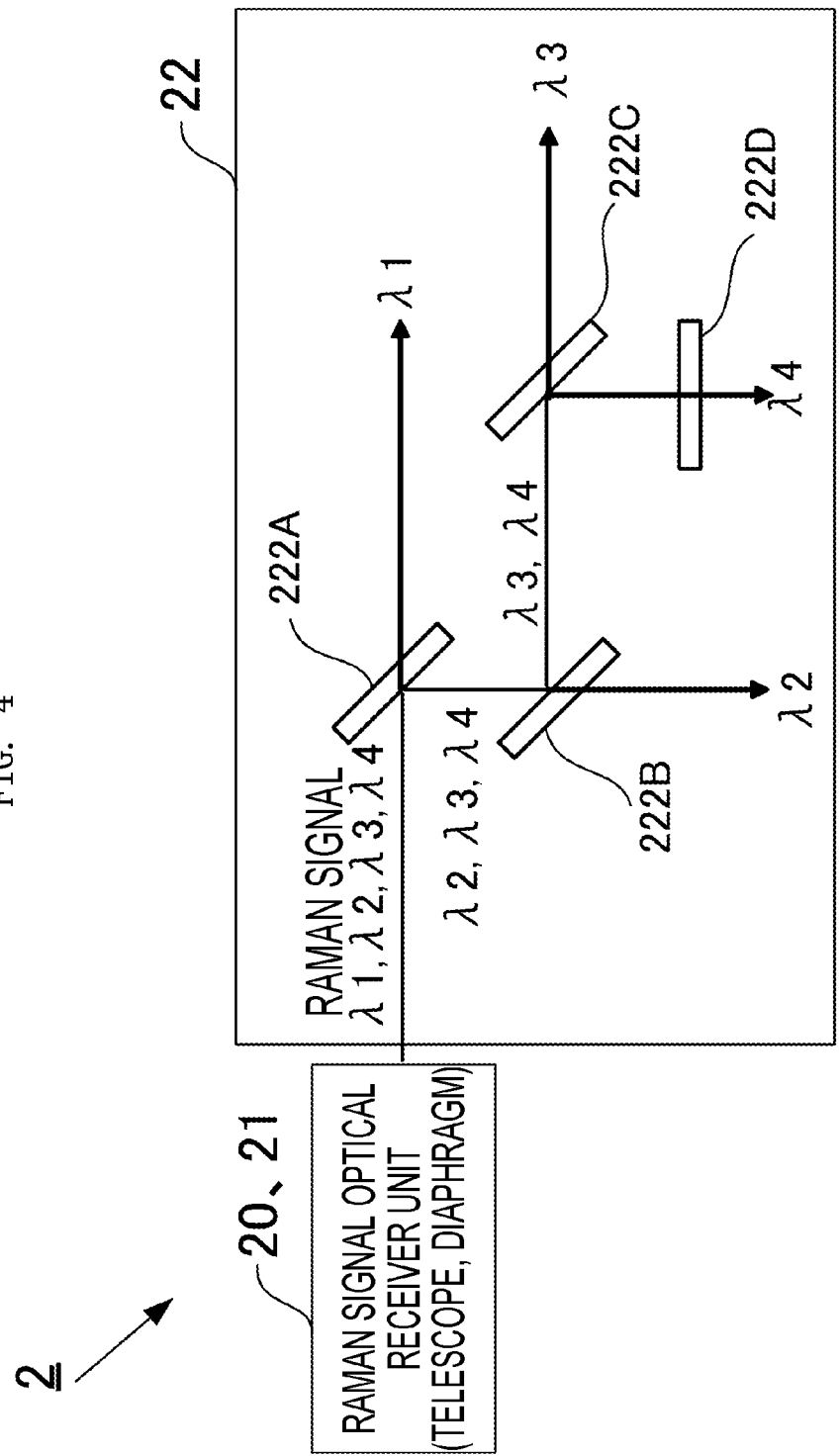
FIG. 4 is a diagram illustrating a configuration of an optical receiver for the meteorological lidar in the embodiment of the present invention.

The configuration of an optical receiver 2 for a meteorological lidar according to another embodiment will be described with reference to FIG. 4. Description of the same components as those of the previously described embodiment will be omitted where appropriate. FIG. 4 is a schematic diagram illustrating the configuration of another embodiment of the optical receiver 2 for a meteorological lidar.

FIG. 4 is a configuration example of the spectrometer of the meteorological lidar in another embodiment. In this example, Raman-scattered light is isolated and extracted with only interference filters, without using dichroic mirrors. In this example, the order of the interference filters can be changed around, as long as they are configured such as to be able to isolate a wavelength.

Namely, a Raman signal A (lambda) enters from the telescope 20 and aperture 21, which are the Raman signal optical receiver unit, and specific wavelengths ($\lambda 1$ to $\lambda 4$) are reflected by dichroic mirrors 221 (221A to 221C), and detected by interference filters 222 (222A to 222D).

The interference filter 222A extracts the light ($\lambda 1$) Raman-scattered by water vapor ($H_2O$) molecules and having a central wavelength of 295 nm, the interference filter 222B extracts the light ($\lambda 2$ Raman-scattered by nitrogen ($N_2$) molecules and having a central wavelength of 284 nm, and the interference filter 222C extracts the light ($\lambda 3$) Raman-scattered by oxygen ($O_2$) molecules and having a central wavelength of 278 nm. Similarly to Embodiment 1, the interference filter 222D is provided as the channel for receiving the light elastically scattered by aerosol or the like (Mie scattered light).

Other features such as the characteristics of interference filters 222 are the same as those of the previous embodiment and will not be described again.

According to another embodiment described above, by using the interference filters in the spectrometer, wavelengths to be transmitted can be readily separated from wavelengths to be blocked. Measurement using the UVC range, in particular, does not require narrow transmission band interference filters since it is hardly affected by the sunlight, and with the use of broad transmission band interference filters that are easily producible and have a high transmittance, the influence of stray light can be avoided and the lidar performance can be improved.

Other Variation Examples

The embodiments described above are given for facilitating the understanding of the present invention and not for limiting the interpretation of the present invention. Various elements in the embodiments, their arrangements, materials, conditions, shapes, sizes and so on are not limited to the illustrated examples and may be changed as required. Also, various features illustrated in different embodiments can be partially interchanged or combined.

While the wavelength of 266 nm is preferable, more or less the same effects would be achieved with the use of a laser beam of a longer wavelength. Examples of longer wavelengths include 355 nm, and 532 nm, the third harmonic and second harmonic of YAG laser, respectively, and 248 nm, 308 nm, and 351 nm of excimer laser.

REFERENCE SIGNS LIST

1 Transmitter
2 Receiver
20 Telescope
21 Aperture
22 Spectrometer
221, 221A to 221C Dichroic mirror
222, 222A to 222D Interference filter
23 Signal processor
100 Meteorological lidar

What is claimed is:

1. An optical receiver implemented in a meteorological lidar emitting a laser beam of a specific wavelength in a UVC range into the air, and measuring scattered light generated by the laser beam, the optical receiver comprising:
 a spectrometer that isolates a specific wavelength from incident light, the spectrometer including interference filters,
 the interference filters including an interference filter that filters light Raman-scattered by nitrogen molecules, an interference filter that filters light Raman-scattered by water vapor molecules, and an interference filter acting as a channel that receives elastically scattered light by a source comprising aerosol,
 the interference filters having different central wavelengths from each other, the interference filters being positioned within the spectrometer whereby the interference filter that filters light Raman-scattered by nitrogen molecules has a full width at half maximum of 5 nm or less, and the interference filter that filters light Raman-scattered by water vapor molecules has a full width at half maximum of 1.2 nm or less.

2. The optical receiver for a meteorological lidar according to claim 1, wherein the interference filters further include an interference filter that filters light Raman-scattered by oxygen molecules, and the interference filter for light Raman-scattered by oxygen molecules has a full width at half maximum of 5 nm or less.

3. The optical receiver for a meteorological lidar according to claim 1, wherein the interference filters are configured as a plurality of interference filters.

4. The optical receiver for a meteorological lidar according to claim 3, wherein at least one of the plurality of interference filters has a central wavelength identical to those of others but has a different half width.

5. The optical receiver for a meteorological lidar according to claim 1, further comprising a dichroic mirror that reflects light of a specific wavelength from incident light while transmitting light of other wavelengths, wherein the spectrometer isolates a wavelength from light reflected by the dichroic mirror.

* * * * *